UNITED STATES PATENT OFFICE.

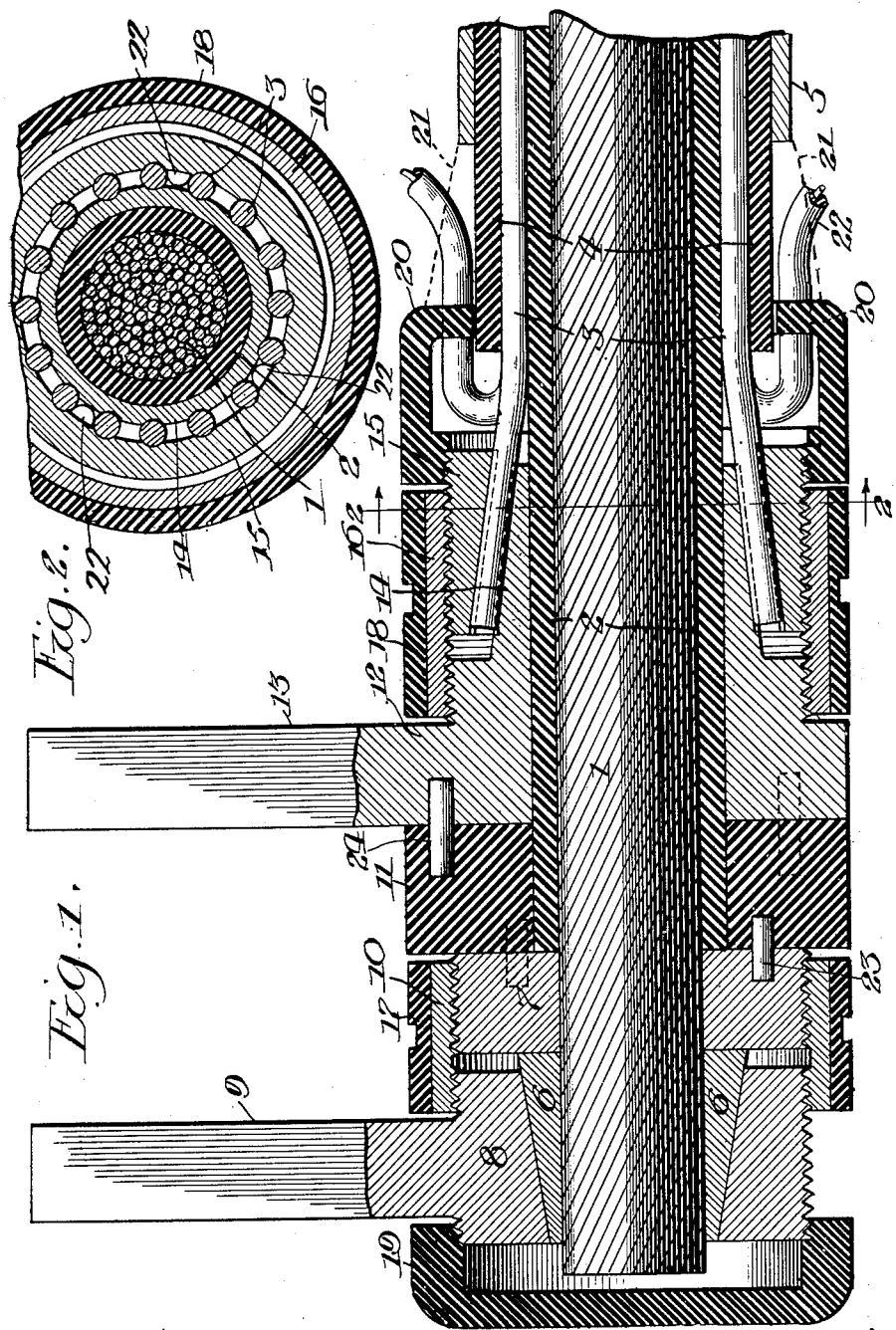

BERTRAND G. JAMIESON AND CARL A. KELLER, OF CHICAGO, ILLINOIS.

CONNECTOR.

1,060,600.  Specification of Letters Patent.  Patented May 6, 1913.

Application filed June 28, 1910. Serial No. 569,275.

*To all whom it may concern:*

Be it known that we, BERTRAND G. JAMIESON and CARL A. KELLER, citizens of the United States, residing at Chicago, in the county of Cook and State of Illinois, have invented a certain new and useful Improvement in Connectors, of which the following is a full, clear, concise, and exact description, reference being had to the accompanying drawings, forming a part of this specification.

Our invention relates to cable terminals and has for its object the provision of a multi potential and cable terminal which in its preferred form is of particular utility in connection with what might be called concentric cables, *i. e.*, cables in which there are two or more conductors within the lead sheath, one conductor surrounding the other conductor.

In making taps from conductors of this kind in the past it has been extremely difficult on account of the thickness of the conductors to properly accommodate them in such a way that connections can be made which shall have a high efficiency and which at the same time do not require an undue amount of space within the manhole wherein these cables usually terminate.

In general our invention provides means for surrounding the inner conductor of the cable with means forced tightly into connection with the inner conductor, and additional means for engaging the outer conductor and grasping same to insure the necessary conductivity of the joint.

We will explain our invention more in detail by reference to the accompanying drawing, illustrating one form of carrying out the invention in which—

Figure 1 is a sectional view of our improved interconnecting apparatus, and Fig. 2 is a partial sectional view on line 2—2 looking in the direction of the arrow.

In this drawing we show our invention as applied to an ordinary form of concentric cable, the arrangement having been in this instance constructed to accommodate a cable of about 3″ in diameter. The size here given will indicate how unwieldly a cable of this sort is when it is attempted to make connections with conductors thereof, as said cable has an unusual rigidity of structure. The instrumentalities used must likewise be of a permanent and very substantial character, as they are used by laborers within the confines of a handhole, or other restricted space and delicate pieces of apparatus would, therefore, not be available. These facts will indicate the importance of the invention which we disclose herein, and it might further be added that these connections when made as herein outlined, provide terminal facilities for removably making connection with or disassociating it from the cable conductors.

The construction shown comprises a cable having an inner conductor 1, covered by suitable insulation 2, and concentrically surrounded by a third conductor 3. The third conductor again is suitably covered with insulation and lead sheath 5 surrounds this outer insulation 4 to complete the cable. It will be apparent from the illustration that the two conductors of the cable are stranded as is customary with cables of the sizes in discussion herein. Conductor 1 is provided with a split wedge shaped sleeve 6, which rests at its right hand extremity against a metallic block 7, and has surrounding it a wedge shaped cylindrical conducting member 8, to which is attached the terminal 9.

The terminal 9 is preferably rectangular so that it can be readily secured to bus bars or other connecting conductors as desired. An internally threaded sleeve 10, engages the outer screw threaded faces of the members 7 and 8, the thread associated with member 8 being preferably left handed and those in association with member 7 right handed. Thus when the member 10 is rotated it serves to draw the members 7 and 8 together and forces the split wedge shaped sleeve 6 tightly between the member 8 and the cable 1, thus forming as tight and secure a connection as is deemed necessary.

We provide a collar 11, preferably of some molded composition, having insulating characteristics, which is interposed between the right hand face of the collar 7, and left hand face of a further collar 12. This collar 12 likewise carries a rectangular terminal 13, which together with the terminal 9, forms the positive and negative leads for the cable. The collar 12 carries a wedge shaped portion 14, which rests upon the insulation 2 and which is designed to receive the upwardly bent individual members of the stranded conductor 3, the wedge shaped member being preferably grooved, as shown by dotted lines, to form a substantial conducting connection with said conductor 3.

A wedge shaped fastening collar 15, is then moved into place over the outside of the conductor 3, and a third collar 16 having right and left hand screw threads is screwed into place by engaging both the member 12 and the member 15, thus drawing the wedge 15 to the left to make a solid conducting connection between said wedge 15, the wedge 14 and the conductor 3.

The outer surfaces of the members 10 and 16 are respectively provided with layers of composition 17 and 18 to prevent said elements from having exposed conducting surfaces. We provide two caps, 19 and 20 as shown, preferably of insulating composition, to further protect and cover the conducting portions as shown.

From the construction so far described it will be seen that we are enabled with apparatus which but slightly increases the outside diameter of the cable, to provide the cable with terminals such as are required for the proper leads to which connection can be made.

Tape 21 is preferably provided between the lead sheath 5 and the member 20 to further insulate and prevent access of moisture to parts which should be protected.

A further feature of our invention consists in the provision of apertures in the cap 20, through which an insulated wire 22 wound with the stranded conductor 3, can be brought out to be used as a pressure wire. Of these pressure wires there are preferably three, angularly displaced by 120 degrees around the cable. Pins 23 and 24 displaced both angularly and radially are provided to hold the members 7, 11 and 12 together to form a substantial structure, the purpose of the displacement of these pins being to avoid possible injurious breaking down of the composition between the two portions of unlike potential, viz., 7 and 12.

While we have herein shown the preferred form of carrying out our invention, we do not limit ourselves to the precise construction and arrangement as herein set forth, as our invention is susceptible of many modifications, but

Having thus described our invention, what we claim as new and desire to secure by Letters Patent is:

1. A device of the character described comprising a cable having two concentrically arranged conductors separated by insulation, a terminal for the outer conductor having a pair of relatively movable clamping members one within the other, and concentric with the inner conductor for the purpose of clamping the outer conductor between them, and means for drawing said clamping members together whereby to clamp the said outer conductor between said clamping members.

2. A device of the character described comprising a cable having two concentrically arranged conductors separated by insulation, a terminal for the outer conductor having a pair of relatively movable clamping members one within the other, and concentric with the inner conductor for the purpose of clamping the outer conductor between them, and a screw threaded ring for drawing said clamping members together whereby to clamp the said outer conductor between said clamping members.

3. A device of the character described comprising a cable having two concentrically arranged conductors separated by insulation, a terminal for the outer conductor having a pair of relatively movable wedge-shaped clamping members, and concentric with the inner conductor for the purpose of clamping the outer conductor between them, and means for drawing said clamping members together whereby to clamp the said outer conductor between said clamping members.

4. A device of the character described comprising a cable having two concentrically arranged conductors separated by insulation, a terminal for the outer conductor having a pair of relatively movable wedge-shaped clamping members, and concentric with the inner conductor for the purpose of clamping the outer conductor between them, and a screw threaded ring for drawing said clamping members together whereby to clamp the said outer conductor between said clamping members.

5. A device of the character described comprising a cable having two concentrically arranged conductors separated by insulation, a terminal for the outer stranded conductor having a pair of relatively movable clamping members one within the other, and concentric with the inner conductor for the purpose of clamping the outer conductor between them, and means for drawing said clamping members together whereby to clamp the said outer conductor between said clamping members, said members having indentations to receive the units of said stranded conductor.

6. A device of the character described comprising a cable having two concentrically arranged conductors separated by insulation, a terminal for the outer stranded conductor having a pair of relatively movable wedge-shaped clamping members, and concentric with the inner conductor for the purpose of clamping the outer conductor between them, and means for drawing said clamping members together whereby to clamp the said outer conductor between said clamping members, said members having indentations to receive the units of said stranded conductor.

7. A device of the character described comprising a cable having two concentrically arranged conductors separated by insulation, a terminal for the outer conductor having a pair of relatively movable annular clamping members one within the other, and concentric with the inner conductor for the purpose of clamping the outer conductor between them, and means for drawing said clamping members together whereby to clamp the said outer conductor between said clamping members.

8. A device of the character described comprising a cable having two concentrically arranged conductors separated by insulation, a terminal for the outer conductor having a pair of relatively movable annular wedge-shaped clamping members, and concentric with the inner conductor for the purpose of clamping the outer conductor between them, and means for drawing said clamping members together whereby to clamp the said outer conductor between said clamping members.

In witness whereof, we hereunto subscribe our names this 14th day of June, A. D. 1910.

BERTRAND G. JAMIESON.
CARL A. KELLER.

Witnesses:
MAX W. ZABEL,
HAZEL JONES.